(12) United States Patent
Ghafoorian et al.

(10) Patent No.: US 12,205,041 B2
(45) Date of Patent: Jan. 21, 2025

(54) TRAINING A GENERATIVE ADVERSARIAL NETWORK FOR PERFORMING SEMANTIC SEGMENTATION OF IMAGES

(71) Applicant: TomTom Global Content B.V., Amsterdam (NL)

(72) Inventors: Moshen Ghafoorian, Diemen (NL); Laurens Samson, Amsterdam (NL); Olaf Booij, Leiden (NL)

(73) Assignee: TomTom Global Content B.V., Amsterdam (NL)

( * ) Notice: Subject to any disclaimer, the term of this patent is extended or adjusted under 35 U.S.C. 154(b) by 362 days.

(21) Appl. No.: 17/625,700

(22) PCT Filed: Jul. 26, 2020

(86) PCT No.: PCT/EP2020/071068
§ 371 (c)(1),
(2) Date: Jan. 7, 2022

(87) PCT Pub. No.: WO2021/018811
PCT Pub. Date: Feb. 4, 2021

(65) Prior Publication Data
US 2022/0277549 A1      Sep. 1, 2022

(30) Foreign Application Priority Data

Jul. 26, 2019  (GB) ..................................... 1910720

(51) Int. Cl.
*G06N 3/088* (2023.01)
*G06T 7/11* (2017.01)
(Continued)

(52) U.S. Cl.
CPC ................ *G06N 3/088* (2013.01); *G06T 7/11* (2017.01); *G06V 10/26* (2022.01); *G06V 10/764* (2022.01);
(Continued)

(58) Field of Classification Search
None
See application file for complete search history.

(56) References Cited

U.S. PATENT DOCUMENTS 10,600,185 B2 *   3/2020  Yang ......................... G06T 7/11
2018/0260957 A1 *  9/2018  Yang ...................... G06T 7/143
(Continued)

FOREIGN PATENT DOCUMENTS

WO       2019194865       10/2019

OTHER PUBLICATIONS

International Search Report dated Jun. 11, 2020 for International patent application No. PCT/EP2020/071068.
(Continued)

*Primary Examiner* — Tahmina N Ansari
(74) *Attorney, Agent, or Firm* — Park, Vaughan, Fleming & Dowler LLP

(57) ABSTRACT

A method of training a generative adversarial network for performing semantic segmentation of images. The generative adversarial network includes a generator neural network and a critic neural network. The method includes using the generator neural network to generate predicted image segmentation maps from input images, wherein each predicted image segmentation map includes a classification prediction for each of a plurality of pixels of a respective input image, providing predicted image segmentation maps generated by the generator neural network to the critic neural network, training the critic neural network to determine weights for respective pixels of a predicted image segmentation map generated by the generator neural network, wherein the weight for each pixel is used to weight a pixel-wise cross entropy term in an objective function for the critic neural network, and using the weights determined by the critic neural network to train the generator neural network.

22 Claims, 7 Drawing Sheets

(51) Int. Cl.
    *G06V 10/26* (2022.01)
    *G06V 10/764* (2022.01)
    *G06V 10/774* (2022.01)
    *G06V 10/82* (2022.01)
    *G06V 20/56* (2022.01)

(52) U.S. Cl.
    CPC ............ *G06V 10/774* (2022.01); *G06V 10/82* (2022.01); *G06V 20/56* (2022.01); *G06T 2207/20081* (2013.01); *G06T 2207/20084* (2013.01)

(56) References Cited

U.S. PATENT DOCUMENTS

2018/0276825 A1* 9/2018 Dai .......................... G06T 7/11
2022/0277549 A1* 9/2022 Ghafoorian ............ G06V 20/56

OTHER PUBLICATIONS

Search Report dated Jan. 8, 2020 for GB application No. 1910720.0.
Luc, P. et al, Semantic Segmentation using Adversarial Networks, arXiv:1611.08408, Nov. 2016, Retrieved from the Internet at https://arxiv.org/pdf/1611.08408.pdf, last accessed on Jan. 7, 2022.
Xue, Y. et al., SegAN: Adversarial Network with Multi-scale L1 Loss for Medical Image Segmentation, arXiv:1706.01805, Jun. 2017, Retrieved from the Internet at https://arxiv.org/pdf/1706.01805.pdf, last accessed on Jan. 7, 2022.
W. Tu et al., "Dense-Residual Network With Adversarial Learning for Skin Lesion Segmentation," IEEE Access, vol. 7, Jun. 2019.

\* cited by examiner

TRAINING A GENERATIVE ADVERSARIAL NETWORK FOR PERFORMING SEMANTIC SEGMENTATION OF IMAGES

CROSS-REFERENCE TO RELATED APPLICATIONS

The present application is a National Stage of International Application No. PCT/EP2020/071068, filed on Jul. 26, 2020, and designating the United States, which claims benefit to United Kingdom Application 1910720.0 filed on Jul. 26, 2019, of which the entire content of these applications is incorporated herein by reference.

BACKGROUND OF THE INVENTION

This invention relates to the training of generative adversarial networks for image segmentation.

Certain convolutional neural networks (CNNs) have been successfully applied to various computer vision problems by posing these problems as image segmentation problems. Examples include road scene understanding for autonomous driving, and interpreting medical imaging. For such applications, networks are typically trained with multi-class per-pixel labels that together form an image-sized segmentation map. The output of such a network is then again an image-sized map, representing per-pixel class probabilities.

However, additional post-processing steps may be needed afterwards, such as applying a conditional random field (CRF), because the output of semantic segmentation networks is not necessarily quality-preserving. Generated segmentation maps are probabilistic and of a different distribution compared with the corresponding labels. The fundamental reason behind this is the way the training loss is formulated (e.g. per-pixel cross entropy), such that each output pixel in the segmentation map is considered independently of all others, i.e. no explicit inter-pixel consistency is enforced.

One approach to preserving quality in semantic segmentation problems is to use generative adversarial networks (GANs) to 'learn' the desired loss function for the segmenter network. GANs typically work by training two networks in an alternating fashion in a minimax game: a generator (e.g. a segmenter) is trained to produce results, while a discriminator is trained to distinguish the predicted segmentation map data (i.e. 'fake' data) from human-labelled ground truth labels (i.e. 'real' data).

GANs have been applied to semantic segmentation problems to try to address issues of per-pixel loss. During training, the generator produces semantic segmentation maps, while the discriminator alternately observes ground truth labels and predicted segmentation maps.

However, the applicant has recognised that known GAN discriminator are prone to learn to distinguish between real and fake data based on simple differences in the value distributions between the fuzzy predictions of the fake data (i.e. fractional values between 0 and 1) and the hard classifications of the real data (i.e. 0 or 1), which can lead to poor classification outcomes.

The present invention seeks to provide a novel approach to training a generative adversarial network that can lead to better image segmentation performance, at least for certain types of input.

SUMMARY OF THE INVENTION

From a first aspect, the invention provides a method of training a generative adversarial network for performing semantic segmentation of images, wherein the generative adversarial network comprises:
a generator neural network; and
a critic neural network,
the method comprising:
using the generator neural network to generate predicted image segmentation maps from input images, wherein each predicted image segmentation map comprises a classification prediction for each of a plurality of pixels of a respective input image;
providing one or more predicted image segmentation maps generated by the generator neural network to the critic neural network;
training the critic neural network to determine weights for respective pixels of a predicted image segmentation map generated by the generator neural network, wherein the weight for each pixel is used to weight a pixel-wise cross entropy term in an objective function for the critic neural network; and
using the weights determined by the critic neural network to train the generator neural network.

From a second aspect, the invention provides a computer processing system implementing a generative adversarial network for performing semantic segmentation of images, wherein the generative adversarial network comprises:
a generator neural network;
a critic neural network; and
training logic,
and wherein the training logic is configured to:
operate the generator neural network to generate predicted image segmentation maps from input images, wherein each predicted image segmentation map comprises a classification prediction for each of a plurality of pixels of a respective input image;
provide one or more predicted image segmentation maps generated by the generator neural network to the critic neural network;
train the critic neural network to determine weights for respective pixels of a predicted image segmentation map generated by the generator neural network, wherein the weight for each pixel is used to weight a pixel-wise cross-entropy term in an objective function for the critic neural network; and
use the weights determined by the critic neural network to train the generator neural network.

From a third aspect, the invention provides computer software comprising instructions which, when executed on a computer processing system, cause the computer processing system to train a generative adversarial network for performing semantic segmentation of images, wherein the generative adversarial network comprises:
a generator neural network; and
a critic neural network,
and wherein the instructions cause the computer processing system to:
operate the generator neural network to generate predicted image segmentation maps from input images, wherein each predicted image segmentation map comprises a classification prediction for each of a plurality of pixels of a respective input image;
provide one or more predicted image segmentation maps generated by the generator neural network to the critic neural network;
train the critic neural network to determine weights for respective pixels of a predicted image segmentation map generated by the generator neural network, wherein the weight for each pixel is used to weight a pixel-wise cross-entropy term in an objective function for the critic neural network; and use the weights determined by the critic neural network to train the generator neural network.

The computer software may further comprise instructions that implement the generator neural network and/or that implement the discriminator neural network. The computer software may be stored on a non-transient computer readable medium (such as a magnetic or solid-state memory), or may be carried by a transient signal (such as an electrical or electromagnetic signal).

Thus it will be seen that, in accordance with the invention, instead of a conventional discriminator network which is trained to discriminate between real and fake segmentation maps, a critic network is provided which learns to assess the relative reliability of different pixel classifications across an image. This can be used to improve the predictions of the generator (segmenter) network. In particular, this approach allows the critic neural network to use inter-pixel consistency clues to spot wrong predictions, and can therefore help to train the generator to focus more on high-level structure.

This helps to overcome the shortcomings of conventional GAN approaches, which can learn to discriminate principally based on pixel values rather than taking proper account of higher-level structure. The use of critic networks as disclosed herein can avoid the generator (segmenter) network being forced to push its predictions toward zeros and ones in order to mimic the low-level property of human annotations. This enables the network better to express uncertainty. It also avoid the softmax probability vectors getting too close to exact zeros and ones, which translate into infinitely large logits, and so can compel the critic to learn more complicated geometrical discrepancies rather than merely scrutinizing the small—but still detectable— value gap between the real and fake distributions. This may allow the generator of the adversarial network to learn properly to preserve the scene structure—e.g. to learn the structural continuity of objects typically found in a street scene.

The weights may represent the relative confidence of the critic in the relative accuracy of the classifications of the pixels across the image—e.g. with the critic placing lower weights on pixels which it has greater confidence have been classified correctly.

The training of the generator neural network and the critic neural network may comprise performing a minimax training process. It is shown below that a minimax game between such a critic network and a generator and can result in notable improvements in the generator's segmentations, both for structural and pixel-wise metrics.

By using the weights in the training of the generator, the generator can be trained to leave as few structural clues as possible in the segmentation images that would enable the critic to identify where to place high weightings that increase its objective function.

Evaluating the objective function for the critic neural network, for a particular segmentation map, may comprise calculating the sum, over all pixels of the segmentation map, of the product of the weight for each pixel with a cross-entropy loss term for the respective pixel. This sum may then be scaled by a scaling factor, e.g. depending on the dimensions of the image, such as dividing by the number of pixels in the image. The critic objective function may decrease as this sum or scaled sum increases—e.g. equalling the negative of the sum or scaled sum. The critic neural network may be trained to maximise this critic objective function.

The generator neural network may be trained to minimise a generator objective function (i.e. a loss function). The generator objective function may be configured to decrease as the critic objective function increases. It may comprise a term that is the inverse (e.g. the negative) of the critic objective function. It may additionally comprise a pixel-wise cross-entropy term. It may equal a pixel-wise cross-entropy term minus the critic objective function.

According to embodiments of the invention, the critic neural network can learn to identify and weight more heavily those areas where the predictions of the network are more likely to be wrong. (Of course, in other embodiments, the objective functions may instead be formulated such that higher weight values are assigned to pixel classifications that are considered relatively more reliable by the critic, relative to the classifications of other pixels in the image.)

The critic network may be restricted to assigning only finite weight values to pixels. This prevents it trivially maximising its objective function by assigning infinite weights. The sum of all the weights over the image may be limited to a threshold amount (which may or may not be attained in each assignment of weights). The critic may be configured to assign weights to each pixel, wherein each weight is in the range zero to one. In some embodiments the weights may be determined by applying a sigmoid function to intermediate weight values generated within the critic network. Determining the weights may comprise applying a spatial smoothing function to intermediate weight values generated within the critic network. Smoothing the weight map can regularise the model to spread the weights over multiple pixel instead of focusing on a single location or pixel.

In some embodiments, the critic neural network receives only input images and image segmentation maps as forward pass inputs. In particular, it does not receive any ground-truth segmentation maps. This contrasts with conventional approaches, which are typically trained alternately on predicted (fake) and ground-truth (real) segmentation maps.

In one set of embodiments, the image segmentation maps provided to the critic comprise fractional values representing the likelihood of a pixel belonging to each class.

However, in another set of embodiments, providing one or more predicted image segmentation maps generated by the generator neural network to the critic neural network may comprise providing the argmax of the image segmentation maps to the critic neural network—i.e. providing binary classification values. This ensures the critic network cannot exploit differences in value distributions between ground-truth and generated segmentation maps. However, because the argmax is not differentiable, the segmenter may then be updated with an approximation of the argmax.

The computer processing system may comprise an input for receive image data from a camera. It may be an in-vehicle computer processing system, or a medical image-processing system. It may be configured to output segmentation data—e.g., to an autonomous driving system.

It should be appreciated that the pixels, or picture elements, referred to herein need not necessarily correspond one-to-one with pixels in a source image. For example, down-sampling or up-sampling may be performed. The input images may be two-dimensional images. However, they could be three-dimensional or n-dimensional images. They may comprise colour information, such as red-green-blue data, or other data layers.

The generator neural network and/or critic neural network may comprise any number of convolution layers, dense blocks, and other conventional layers. The generator neural network and/or critic neural network and/or training logic may comprise software instructions for a processor, or may comprise dedicated hardware logic, or may comprise a combination of both. The computer processing system may comprise one or more of: CPUs, DSPs, GPUs, FPGAs, ASICs, volatile memory, non-volatile memory, inputs, outputs, displays, network connections, power supplies, radios, clocks, and any other appropriate components. It may be configured to store or display or output a predicted segmentation map or other segmentation data.

Some embodiments may achieve segmentation predictions that are sufficiently similar to the training labels that no additional problem-specific loss terms and/or post-processing steps are required.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
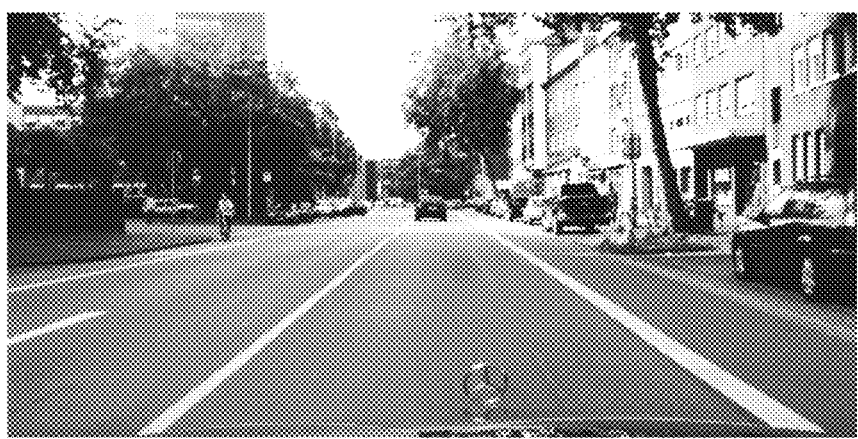
FIG. 1 is a first example RGB input image of a street scene.

Described below are certain exemplary neural networks, embodying the invention, which use adversarial training for performing semantic image segmentation. These novel types of artificial neural network will sometimes be referred to herein as "Gambling Adversarial Networks".

Techniques disclosed herein have been tested on the segmentation of street scenes acquired by cameras on automotive vehicles and have been found to be particularly effective at this task. However, it should be understood that these networks may also be applicable to other image segmentation problems in diverse fields.

Context

To provide context for the description and terminology used below, a conventional approach to semantic segmentation using Generative Adversarial Networks (GANs) will first be described.

In a typical adversarial training formulation, a discriminator learns to discriminate human-annotated ground-truth segmentations (i.e. "real" labels) from predictions provided by the network (i.e. "fake" labels). By involving the generator (which may be referred to as a segmenter) and discriminator in a minimax game, the generator is challenged to improve its predictions to provide realistic-looking segmentation predictions to fool the discriminator, ideally in a way that leads the generator producing desirable high-level structural qualities such as connectivity, inter-pixel consistencies, and smoothness.

The minimax game may be set up by forming the following loss term for the discriminator:

$$\mathcal{L}_d(x,y;\theta_s,\theta_d) = \mathcal{L}_{bce}(d(x,s(x;\theta_s);\theta_d),0) + \mathcal{L}_{bce}(d(x,y;\theta_d),1)$$

where:
- x is the input image (e.g. a set of 2D red-green-blue pixel values);
- y is a corresponding classification label map (i.e. ground-truth data);
- $s(x; \theta_s)$ is the segmenter's mapping of the input image x to a dense segmentation map, parameterized by $\theta_s$;
- $d(x, y; \theta_d)$ represents the discriminator operating on segmentations y, parameterized by $\theta_d$, conditioned on input image x; and
- the binary cross-entropy is defined as $\mathcal{L}_{bce}(\hat{y}, y) = -(y \log \hat{y} + (1-y)\log(1-\hat{y}))$.

The loss function for the segmenter may be a combination of a low-level (pixel-wise) loss term, $\mathcal{L}_{ce}$, and a high-level (adversarial) loss term, $\mathcal{L}_{bce}$, for preserving higher-level consistency:

$$\mathcal{L}_s(x,y;\theta_s,\theta_d) = \mathcal{L}_{ce}(s(x;\theta_s),y) + \lambda \mathcal{L}_{bce}(d(x,s(x;\theta_s);\theta_d),1)$$

The parameter $\lambda$ determines the relative importance of the adversarial loss, which may be a non-saturating reformulation of the original minimax loss term, to prevent vanishing gradients.

The pixel-level cross-entropy $\mathcal{L}_{ce}$ optimizes all the pixels independently of each other by minimizing $$\mathcal{L}_{ce}(\hat{y}, y) = -\frac{1}{wh}\sum_{i,j}^{w,h}\sum_{k}^{c} y_{i,j,k} \log \hat{y}_{i,j,k}$$

where w and h are the width and the height of image x, and c is the number of classes in the dataset (i.e. the number of classes to which each pixel can be attributed).

Ideally, a discriminator would make its decisions purely based on the structural differences between real and the fake segmentation predictions. However, in conventional setups, it is often possible for the discriminator to perfectly distinguish the labels from the predictions based on the prediction values alone. This is because the output of the segmenter is typically a softmax vector for each pixel, which assigns a probability, between zero and one, of the pixel belonging to each class. In contrast, the values in the human-generated ground-truth segmentation are binary—i.e. zeros or ones—when using the typical one-hot notation. The discriminator can therefore learn to identify generated labels based on the fact that they contain non-binary values.

Such value-based discrepancy can yield unsatisfactory gradient feedback since it can force the segmenter simply to mimic the one-hot notation of the ground-truth labels, instead of identifying global structures. It can also become a never-ending training problem, since realizing exact ones and zeros translate into infinitely large logits, which always leaves a small value-based gap that can be exploited by the discriminator.

Another undesired outcome can be the loss of ability for the segmenter to express uncertainty, since all its predictions will converge towards a one-hot representation.

Gambling Adversarial Networks

In contrast to conventional approaches, the presently-described embodiments depart from the traditional "real-fake" adversarial training approach. Instead of a conventional discriminator network, they use a novel critic network which learns to distinguish between correct and incorrect pixel classification predictions through a consideration of the whole prediction map. These critic networks, also referred to herein as gambling adversarial networks, are prevented from utilising the value-based discrepancy so that they instead improve the structural inconsistencies in the segmenter's predictions.

The critic network (also referred to herein as the gambler network) does not observe the human-classified ground-truth labels, but instead only a red-green-blue (RGB) image and associated prediction of the segmentation network (a generator neural network) pass through the critic. Given a limited investment budget, the gambler predicts an image-sized betting map (i.e. having the same number of pixels as the RGB image), where a high bet (i.e. a weight as described above) indicates a pixel that is likely incorrectly classified, given the contextual prediction clues around the pixel. The betting map embodies the set of weights for an image, as disclosed herein. Since the gambler receives the entire prediction map, predictions that are badly-formed structurally, such as non-smoothness, disconnectivities and shape-anomalies, provide visual clues for profitable investments by the gambler.

Figure 2:
FIG. 2 is a segmentation map of the first example input image generated using a conventional method.
Figure 3:
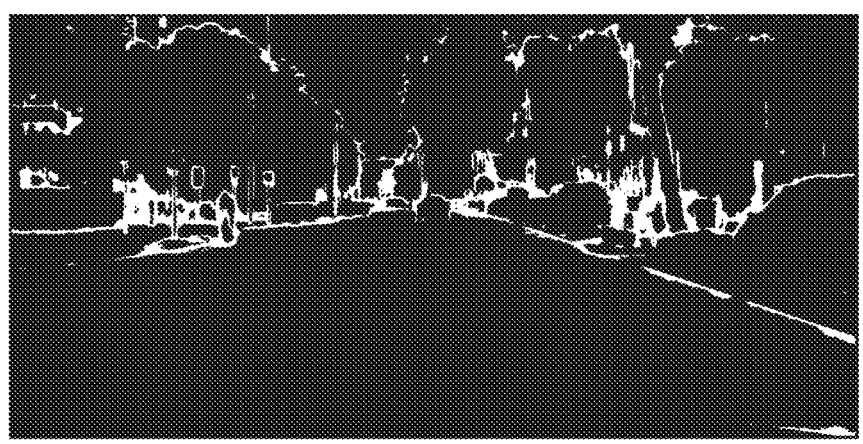
FIG. 3 is a weighting map for the first example input image generated using a method embodying the invention.
Figure 4:
FIG. 4 is a segmentation map of the first example input image generated using a method embodying the invention.

FIGS. 1-4 provide an example of improvements that can be yielded using this approach. FIG. 1 shows an image of a street scene. Although it is here rendered in greyscale, the original image is a full-colour RGB image. FIGS. 2 & 4 are greyscale representations of multi-class segmentation maps. The actual segmentation maps label each image pixel with the likelihoods that the pixel belongs to each of 19 classes, which include "road", "person", "bicycles", "building", "pole", "traffic sign", "vegetation", etc. For the purposes of these visual representations, only the argmax of the probabilities is shown (i.e. the most probable class for each pixel). FIG. 2 has been classified by a conventional U-Net convolutional neural network, while FIG. 4 has been classified by a gambling adversarial network embodying the invention. FIG. 3 is a betting map image showing the confidence value assigned to each pixel by the gambling adversarial network, where lighter shades represent lower confidence in the correctness of the classification and darker shades represent higher confidence. It can be seen that the predictions in FIG. 4 are better than those in FIG. 2—e.g. with fewer spurious pixel classifications on the wall of the office building around the parked car and the tree on the far right of the scene.

Figure 5:
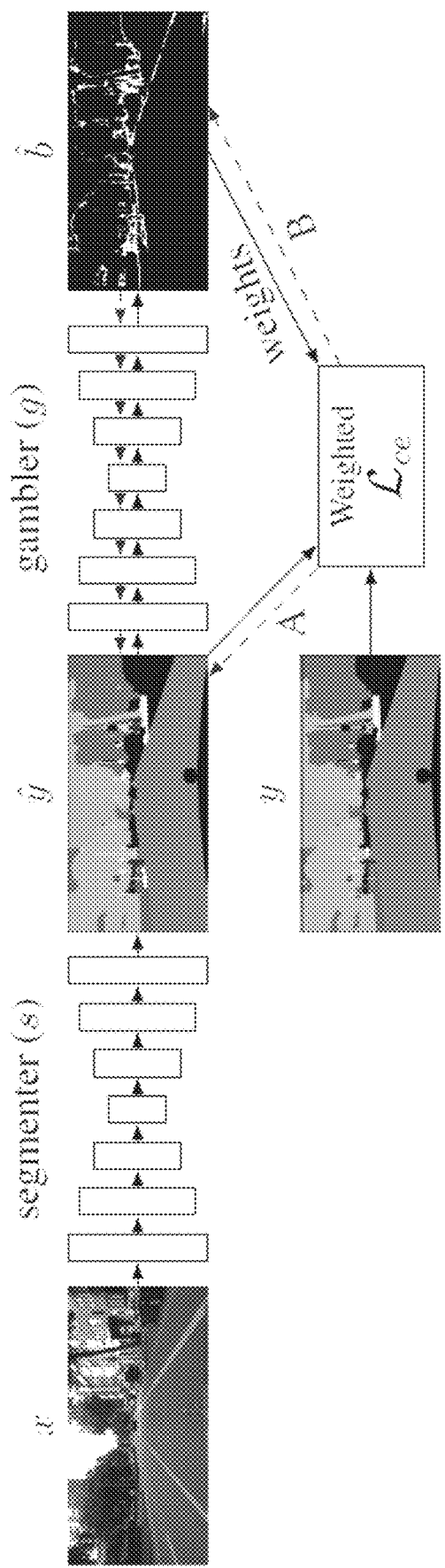
FIG. 5 is a schematic diagram of a generative adversarial network embodying the invention.

FIG. 5 provides an overview of the gambling adversarial network, in which x is an input image, y is a human-classified label map, ŷ is a predicted image segmentation map from the segmenter network, and b̂ is the corresponding betting map generated by the gambler network. The left-to-right horizontal arrows through the layers represent the forward pass of the input image and segmentation map; the right-to-left horizontal arrows through the layers represent the forward-pass weights; and the other arrows represent gradient flows.

Similar to conventional adversarial training, the gambler and segmenter are trained by playing a minimax game. Here, the gambler is trained by maximizing the expected weighted pixel-wise cross-entropy, where the weights are determined by its betting map:

$$\mathcal{L}_g(x, y; \theta_s, \theta_g) = -\frac{1}{wh}\Sigma_{i,j}^{w,h} g(x, s(x;\theta_s); \theta_g)_{i,j} \mathcal{L}_{ce}(s(x;\theta_s)_{i,j}, y_{i,j})$$

in which $g(x, \hat{y}; \theta_g)_{i,j}$ is the amount of budget (i.e. the weight) that the gambler invests on position (i,j) given an input image x and the prediction map ŷ.

The segmented network is trained by minimizing the opposite—i.e.:

$$\mathcal{L}_s(x,y;\theta_s,\theta_g) = \mathcal{L}_{ce}(s(x;\theta_s),y) - \mathcal{L}_g(x,y;\theta_s,\theta_g)$$

The segmentation network is optimizing a combination of loss terms: a per-pixel cross-entropy loss and an inter-pixel adversarial loss. It should be noted that the gambler can easily maximize this loss by betting infinite amounts on all the pixels. Therefore, the budget the gambler can spend should be limited. This may be accommodated by turning the betting map into a smoothed probability distribution:

$$g(x, \hat{y}; \theta_g)_{i,j} = \frac{g_\sigma(x, \hat{y}; \theta_g)_{i,j} + \beta}{\sum_{k,l}^{w,h} g_\sigma(x, \hat{y}; \theta_g)_{k,l} + \beta}$$

wherein β is a smoothing factor and $g_\sigma(x, \hat{y}; \theta_g)_{i,j}$ represents the sigmoid (i.e. between zero and one) output of the gambler network for pixel with the indices i, j. Smoothing the betting map regularizes the model to spread its money over multiple pixels, instead of focusing on a single pixel.

The adversarial loss causes two different gradients streams for the segmentation network, as shown in FIG. 5, where the solid diagonal arrows indicate the forward pass gradient flows, and the dashed arrows represent the backward gradient flows. In the backward pass, the gradient flow A pointing directly towards the prediction ŷ is providing pixel-wise feedback independent of the other pixel predictions. Meanwhile, the gradient flow B, going through the gambler network, reflects inter-pixel and structural consistencies.

While the adversarial loss in the present gambling adversarial networks bears some passing similarities to focal loss methods (see "Focal loss for dense object detection", Lin et al., *Proceedings of the IEEE international conference on computer vision*, pages 2980-2988, 2017), since both methods up-weight the harder samples that contain more useful information for the update, the adversarial loss in the present gambling adversarial networks learns the weighting map, unlike in focal loss methods. Moreover, as well as a gradient stream providing information to the segmentation network independent of other pixel predictions—flow A in FIG. 5—the adversarial loss in the present methods additionally generates an extra flow of gradients—flow B in FIG. 5—which reflects structural qualities; this is also quite different from focal loss approaches.

Experimental Results

In this section, an experimental evaluation of embodiments of the gambling adversarial network architecture disclosed herein is described. First, the datasets and metrics will be described, then the different network architectures for the segmenter and gambler networks, including details of the training, and lastly the results of various experiments are described.

Datasets

Experiments were conducted on two different urban road-scene semantic segmentation datasets: Cityscapes and the Cambridge-driving Labeled Video Database (CamVid). However, it is expected that the same approach can be applied effectively to any segmentation dataset.

The Cityscapes dataset contains 2975 training images, 500 validation images and 1525 test images with a resolution of 2048×1024, consisting of 19 different classes, such as car, person and road sign. For pre-processing the data, the images were downscaled to 1024×512, random flipping was performed, and a random crop of 512×512 was taken for training. Furthermore, intensity jittering was applied to the RGB-images.

The urban scene CamVid dataset consists of 429 training images, 101 validation images and 171 test images with a resolution of 960×720. The same pre-processing was applied to this dataset also, except that no down-scaling was performed.

Metrics

In addition to the mean intersection over union (IoU), the structural consistency of the segmentation maps was also quantified. Firstly, the BF score was computed, which measures whether the contours of objects in the predictions are matching with the contours of the ground-truth. A point is matching if the distance between the ground-truth and prediction lies within a toleration distance r which was set to 0.75% of the image diagonal. Furthermore, a modified Hausdorff distance was utilised to quantitatively measure the structural correctness. The original Hausdorff distance was slightly modified to prevent it from being overwhelmed by the outliers:

$$d_H(X, Y) = \frac{1}{2}\sum\left\{\frac{1}{|X|}\sum_{x \in X} \inf_{y \in Y} d(x, y), \frac{1}{|Y|}\sum_{y \in Y} \inf_{x \in X} d(x, y)\right\}$$

where x and y are the contours of the predictions and labels from a particular class and d(x, y) is the Euclidean distance. The score was averaged over all the classes that are present in the prediction and the ground-truth.

Network Architectures

Performance was compared using two well-known baseline segmentation network architectures:
  a U-net based architecture (see "Convolutional networks for biomedical image segmentation" by Ronneberger et al., International Conference on Medical image computing and computer-assisted intervention, pages 234-241. Springer, 2015) as implemented in pix2pix (see "Image-to-image translation with conditional adversarial networks" by Isola et al., Proceedings of the IEEE conference on computer vision and pattern recognition, pages 1125-1134, 2017), which is an encoder-decoder structure with skip connections. The encoder consists of nine down-sampling blocks containing a convolution, batch normalization and ReLu. The decoder blocks are the same, except that the convolutions are replaced by transposed convolutions; and
  PSP-net, which utilises a pyramid pooling module to capture more contextual information (see "Pyramid scene parsing network" by Zhao et al., Proceedings of the IEEE conference on computer vision and pattern recognition, pages 2881-2890, 2017). An image-net pre-trained ResNet-101 was utilised as the backbone.

For the gambler network, the same networks were utilised as for the segmentation network. When training with the U-net based architecture, the gambler network is identical except that it contains only six down-sampling blocks. For the PSP-net architecture, the architecture of the gambler and segmenter are identical. For the baseline adversarial methods, the PatchGAN discriminator from pix2pix was utilised.

Training

For training the models, an Adam optimizer was utilised with a linearly decaying learning-rate over time, similar to conventional adversarial training. The gambler and segmenter were trained in an alternating fashion where the gambler is frozen when updating the segmenter and vice versa. Furthermore, the best results for the gambling adversarial networks were obtained with no pre-training of the segmentation network before starting the adversarial training Results—Confidence Expression As discussed above, value-based discrimination encourages the segmentation network to mimic the one-hot vectors of the ground-truth and results in a loss of ability to express uncertainty. To verify that embodiments of the invention mitigate these problems, the mean and standard deviation of the maximum class-likelihood value in every softmax vector for each pixel was tracked on the validation set over different training epochs. The results are depicted in FIG. 6.

Figure 6:
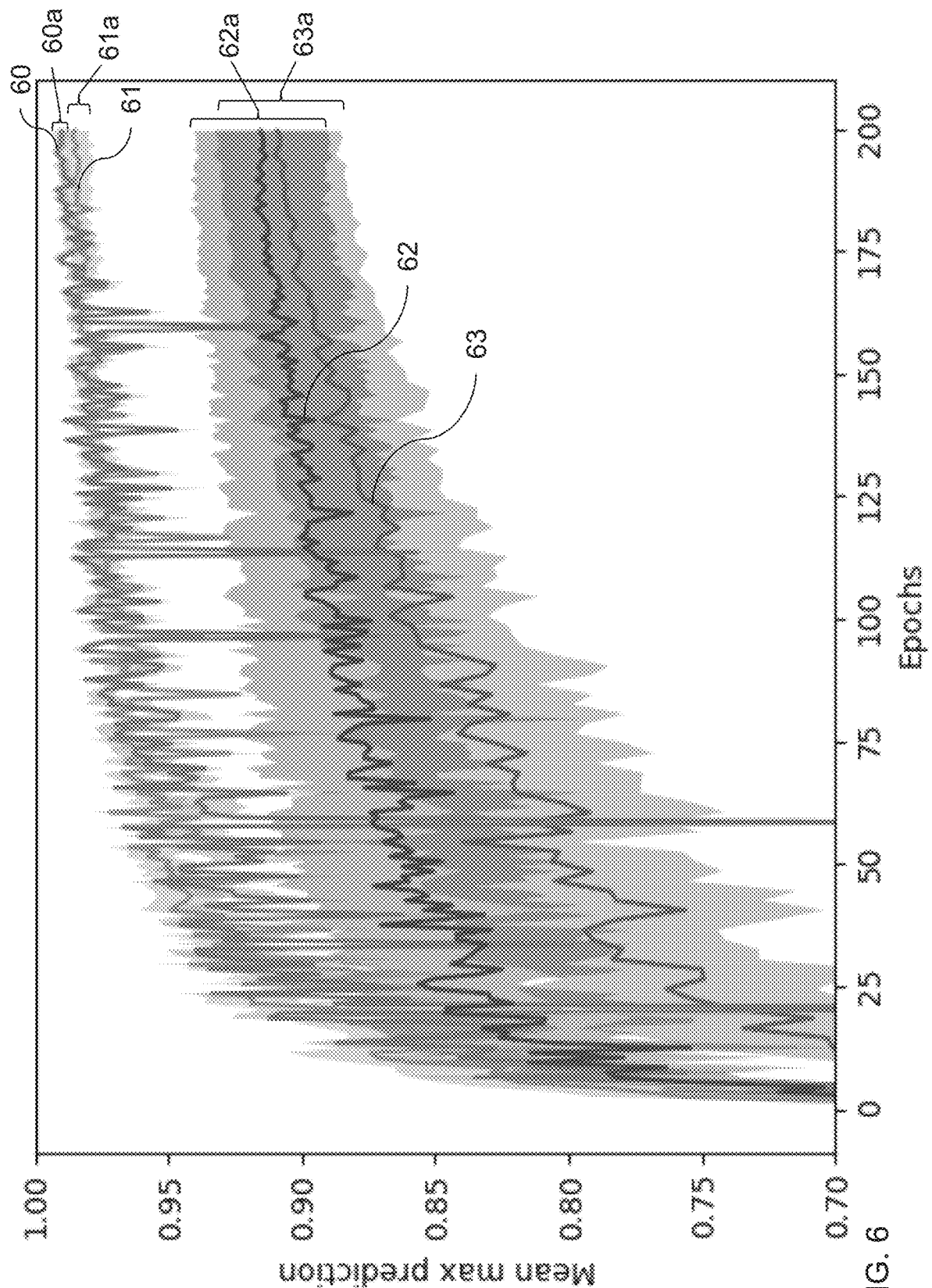
FIG. 6 is a graph comparing the performance a network embodying the invention with conventional networks.

FIG. 6 shows mean maximum class-likelihoods (mean confidence) over time on the Cityscapes validation set using four different models:
  cross-entropy ("CE"),
  standard cross-entropy with adversarial training ("CE+adv") (see "Semantic segmentation using adversarial networks" by Luc et al., arXiv: 1611.08408, 2016),
  Embedding-loss Generative Adversarial Network ("EL-GAN") (see "El-gan: embedding loss driven generative adversarial networks for lane detection" by Ghafoorian et al., Proceedings of the European Conference on Computer Vision, 2018), and
  gambling networks as disclosed herein ("Gambling nets").

The solid central curves 60, 61, 62, 63 represent the means using EL-GAN 60, CE+adv 61, Gambling nets 62 and CE 63, respectively. The shaded areas 60a, 61a, 62a, 63a surrounding the means represent the corresponding standard deviations.

In both the standard CE+adv adversarial training and EL-GAN, which discriminate the real from the fake predictions, it can be seen from FIG. 6 that the predictions 60, 61 converge towards one, with barely any standard deviation. For the gambling adversarial network, the uncertainty of the predictions 62 is well-preserved.

The following table shows the mean maximum value in every softmax vector, averaged over the last ten epochs. This confirms that the gambling adversarial networks maintain the uncertainty similarly to the cross-entropy model, while the known adversarial methods attempt to converge to a one-hot vector:

| Method | Mean max |
|---|---|
| Cross-entropy | 90.7 ± 2.3% |
| Cross-entropy + adversarial | 98.4 ± 0.5% |
| EL-GAN | 98.9 ± 0.2% |
| Gambling nets | 91.4 ± 2.4% |

The U-net based architecture on Cityscapes was used in these experiments, but similar results been observed using other segmentation network and on the other datasets.

Results—U-Net Based Segmenter

The baselines were compared with the gambling adversarial networks on the validation set on Cityscapes with the U-net based architecture. The results in the following table show the gambling adversarial networks performing better not only on the pixel-wise metric (IoU), but also on the structural metrics, than CE, CE+adv, and EL-GAN. The "Focal loss" method employs techniques described in "Focal loss for dense object detection", Lin et al., *Proceedings of the IEEE international conference on computer vision*, pages 2980-2988, 2017:

| Method | Mean IoU | BF-score | Hausdorff |
|---|---|---|---|
| CE | 52.7 | 49.0 | 36.8 |
| Focal loss | 56.2 | 55.3 | 30.2 |
| CE + adv | 56.3 | 57.3 | 31.3 |
| EL-GAN | 55.4 | 54.2 | 31.6 |
| Gambling nets | 57.9 | 58.5 | 27.6 |

In the following table, the IoU per class is provided for the same experiments. The gambling adversarial networks perform better on most of the classes. It performs particularly well on the classes with finer structures, such as traffic lights and persons:

| Method | road | swalk | build | wall | fence | pole | light | sign | veg. |
|---|---|---|---|---|---|---|---|---|---|
| CE | 95.2 | 68.4 | 84.4 | 26.0 | 30.9 | 43.0 | 38.9 | 51.3 | 87.2 |
| Focal loss | 96.0 | 71.3 | 87.1 | 32.2 | 34.9 | 48.6 | 47.6 | 57.8 | 88.9 |
| CE + adv | 95.9 | 72.7 | 83.5 | 28.9 | 35.2 | 49.8 | 47.8 | 59.3 | 89.0 |
| EL-GAN | 96.1 | 71.1 | 86.8 | 33.5 | 37.0 | 48.7 | 46.6 | 57.3 | 88.9 |
| Gambling | 96.3 | 73.0 | 87.6 | 33.4 | 39.1 | 52.9 | 51.3 | 61.9 | 89.7 |

| ter. | sky | pers | rider | car | truck | bus | train | mbike | bike | mean |
|---|---|---|---|---|---|---|---|---|---|---|
| 50.3 | 91.5 | 59.0 | 32.6 | 85.5 | 22.8 | 43.2 | 19.2 | 15.4 | 57.4 | 57.2 |
| 54.2 | 92.7 | 62.9 | 33.5 | 87.2 | 28.5 | 47.5 | 18.3 | 19.3 | 60.0 | 56.2 |
| 54.8 | 92.3 | 66.4 | 38.4 | 87.2 | 27.8 | 41.4 | 15.3 | 20.3 | 62.5 | 56.3 |
| 53.6 | 92.9 | 62.6 | 34.4 | 87.1 | 26.0 | 38.3 | 16.3 | 17.8 | 58.9 | 55.4 |
| 55.8 | 93.1 | 68.1 | 38.9 | 88.7 | 30.3 | 40.2 | 11.5 | 24.8 | 63.2 | 57.9 |

Figure 7:
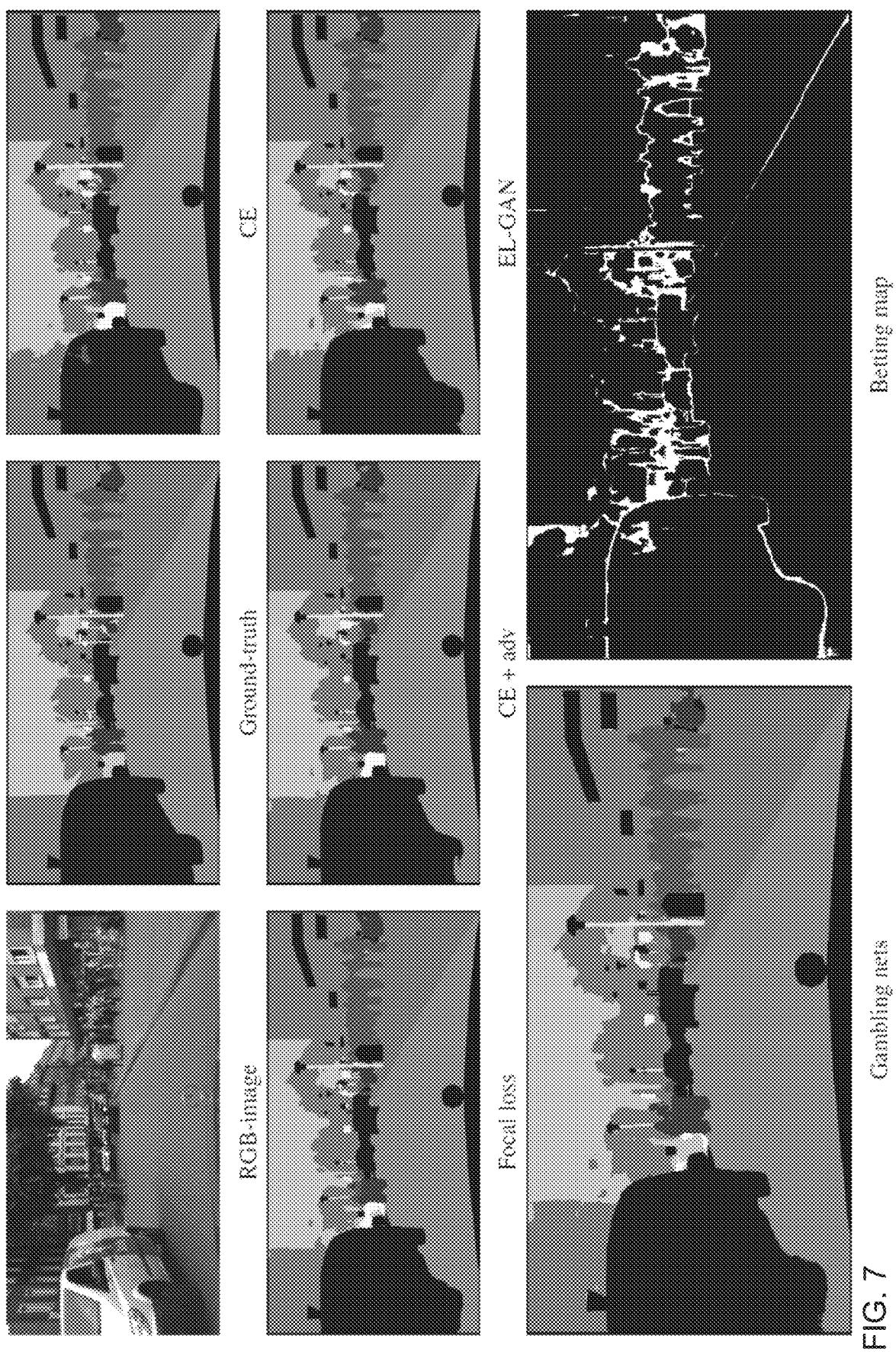
FIG. 7 is a set of images including a second example RGB input image of a street scene and various segmentation maps generated using conventional methods and a method embodying the invention.

FIG. 7 shows some qualitative results. The input image (top left) is represented here in greyscale, but was processed as an RGB image. The ground truth (top middle) is a human-labelled classification. The various segmentation outputs were generated using the methods already described above. The gambling adversarial network correctly resolves some of the artefacts, such as the pattern on the side of the van on the left foreground, which is visible in the CE segmentation. Moreover, the boundaries of the pedestrians on the pavement (sidewalk) are more precise and closer to those of the ground-truth labelled data. An example betting map represents the gambler's assignment of confidence values (weights) across the image, given the predictions from the baseline model trained with cross-entropy in combination with the RGB-image. Note that the gambler bets on the badly shaped building and also responds to the artefacts in the van on the left.

Results—PSP-Net Segmenter

Experiments were conducted with the PSP-net segmenter on the CamVid and Cityscapes datasets.

The following table shows results are shown on the Cityscapes validation set:

| Method | Mean IoU | BF-score | Hausdorff |
|---|---|---|---|
| CE | 72.4 | 69.0 | 19.4 |
| Focal loss | 71.5 | 67.4 | 21.2 |
| CE + adv | 68.0 | 67.6 | 20.9 |
| EL-GAN | 66.2 | 64.5 | 23.6 |
| Gambling nets | 73.1 | 70.1 | 18.7 |

Again, the gambling adversarial network scores better than the existing methods, on both of the structure-based scores as well as the mean IoU.

Figure 8:
FIG. 8 is a third example RGB input image of a street scene.
Figure 9:
FIG. 9 is a ground-truth segmentation map of the third example input image.
Figure 10:
FIG. 10 is a segmentation map of the third example input image generated using a conventional method.
Figure 11:
FIG. 11 is a segmentation map of the third example input image generated using a method embodying the invention.

FIGS. 8-11 show some qualitative results. FIG. 8 shows the input RGB image (represented here in greyscale). FIG. 9 shows the ground-truth labels. FIG. 10 shows the cross-entropy output, while FIG. 11 shows the gambling network segmentation output. The gambling adversarial networks can be seen to be providing more details on the traffic lights, for example. Also, the structure of the pavement (sidewalk) shows significant improvements over the predictions from the model trained with standard segmentation loss.

Quantitative results for the Camvid dataset are shown in the following table:

| Method | Mean IoU | BF-score | Hausdorff |
|---|---|---|---|
| CE | 68.0 | 57.1 | 28.3 |
| Focal loss | 65.7 | 55.4 | 28.5 |

| Method | Mean IoU | BF-score | Hausdorff |
|---|---|---|---|
| CE + adv | 69.4 | 57.0 | 27.5 |
| EL-GAN | 64.6 | 53.4 | 34.0 |
| Gambling nets | 69.9 | 59.5 | 28.2 |

The gambling adversarial networks here achieve the highest score on the mean IoU and the BF-score, but the standard adversarial training (CE+adv) also achieves reasonable performance. On the BF-score, the gambling adversarial networks perform significantly better than the other methods, whereas the Hausdorff distance is better in the standard adversarial training although by a smaller margin.

Analysis

In the gambling adversarial network, a critic network is trained to learn to spot the likely incorrect predictions. As shown in FIG. 6, the discrimination of real and fake causes undesired gradient feedback, since all the softmax vectors are converging to a one-hot vector. This behaviour is caused by a value-based discrimination of the adversarial network. Moreover, replacing the conventional adversarial task with correct/incorrect discrimination for individual pixels solves several problems. First of all, the reason to apply adversarial training to semantic segmentation is to improve the high-level structures. However, a conventional value-based discriminator not only provides feedback based on the visual difference between the predictions and the labels, but also an undesirable value-based feedback. Moreover, updating the weights in a network with the constraint that the output must be a one-hot vector complicates training unnecessarily. Finally, the value-based discriminator hinders the network from properly disclosing uncertainty. Both the structured prediction and expressing uncertainty can be of great value for semantic segmentation, e.g. in autonomous car-driving and medical imaging. However, changing the adversarial task to discriminating the correct from the incorrect predictions resolves the aforementioned issues. The segmentation network is not forced to imitate the one-hot vectors, which allows it to preserve the uncertainty in the predictions and simplifies the training Although the gambler may sometimes still utilise the prediction values by betting on pixels where the segmenter is uncertain, these experimental results demonstrate that improvements to the structure-based metrics can be achieved compared with the existing adversarial methods. In particular, empirical evaluations on two road-scene semantic segmentation tasks have shown that the proposed method not only enables the expressing of uncertainties, but also improves both pixel-wise and structure-based metrics and further stabilizes the training procedure.

Variant Embodiments

To completely eliminate the value-based discrepancy, in alternative set of embodiments, the gambler (a critic neural network) is trained on the argmax of the segmenter (a generator neural network). The only way to distinguish the argmax of the predictions from the ground-truth is to analyse the visual differences. Because the argmax is not differentiable, the segmenter is updated with an approximation of the argmax.

In contrast with the gambling networks disclosed above, the gambler here receives as input either (i) the one-hot encoded argmax in combination with the corresponding RGB-image, or (ii) the one-hot encoded ground-truth in combination with the corresponding RGB-image. Because the ground-truth and predictions do not have a value-based difference anymore, the ground-truth can also be utilized for training.

The output of the gambler is an input-sized image, assigning a probability to each pixel whether it is correct or incorrect. Because the values are either 0 or 1 in the input due to the argmax operation, the predictions are binary—i.e. either "correct" or "incorrect".

Therefore, the adversarial loss function for the gambler is changed into a binary cross-entropy loss:

$$\mathcal{L}_g(x, y; \theta_s, \theta_g) =$$
$$\frac{1}{wh} \Sigma_{i,j}^{w,h} \mathcal{L}_{BCE}\big(g(x, s_{arg}(x; \theta_s); \theta_g)_{i,j}, z_{i,j}\big) + \mathcal{L}_{BCE}\big(g(x, y; \theta_g)_{i,j}, 0\big)$$

where s is the segmentation network, $s_{arg}$ returns an estimation of the argmax, 0 indicates that the pixel is correct, and $z_{i,j}$ indicates if the pixel (i,j) was predicted correctly by the segmenter. As previously, $g(x, \hat{y}; \theta_g)_{i,j}$ is the amount (i.e. the weight) that the gambler invests on position (i,j) given an input image x and a predicted segmentation map $\hat{y}$ (and similarly for the ground-truth segmentation y). Note that all the predictions are correct for the ground-truth. The gambler's training data is heavily unbalanced since the ground-truth does not contain any errors and the accuracy of the predictions is also increasing over training time. To mitigate this, the BCE loss is weighted and the ground-truth is fed to the gambler less often than the prediction.

Meanwhile, the segmenter is pushing its predictions closer to what the gambler's concept is of correct:

$$\mathcal{L}_s(s(x;\theta_s), s_{arg}(x;\theta_s), y; \theta_s, \theta_g) = \mathcal{L}_{ce}(s(x;\theta_s), y) + \mathcal{L}_g(g(x, s_{arg}(x;\theta_s)), 0; \theta_s, \theta_g)$$

where 0 stands for a good prediction, and 1 would indicate an erroneous prediction. Essentially, the segmenter is requesting the gambler for feedback to push its predictions closer to perfect.

To pass the gradient from the gambler to the segmenter, an estimation of the argmax function is required. It is impossible to perform the argmax operation on the segmenter's output while the segmenter is training, since it is not differentiable. Nevertheless, the gambler is trained on argmax inputs. To minimise the shift in the data distribution for the gambler, an operation to approach a one-hot prediction can be performed, as illustrated in FIG. 12.

Figure 12:
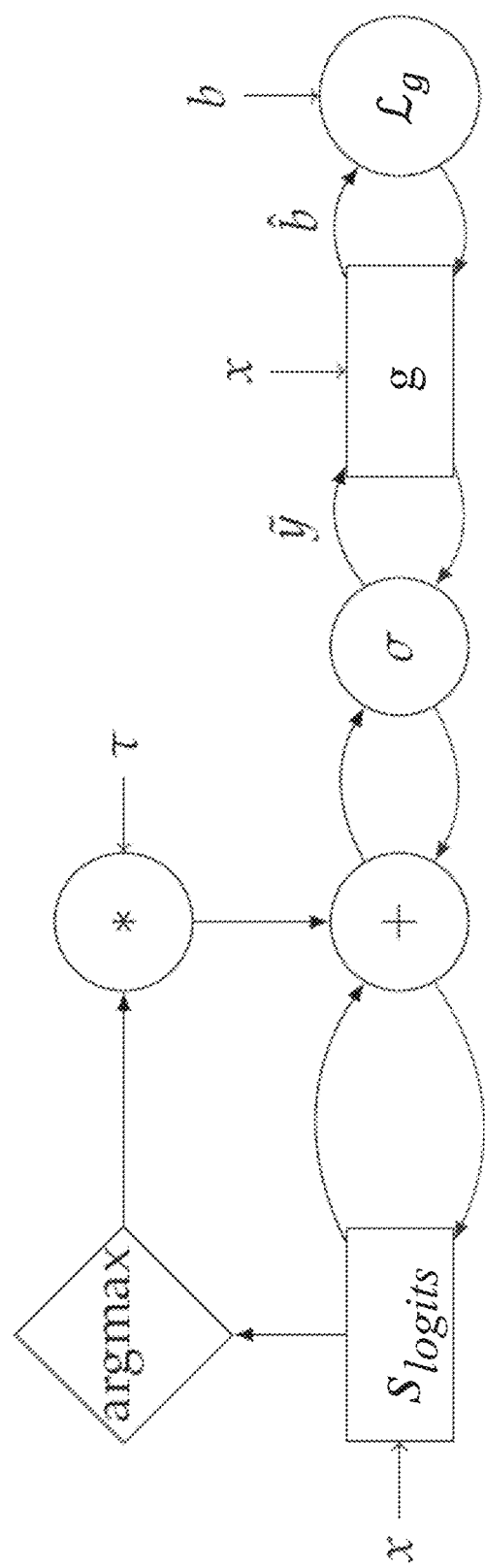
FIG. 12 is a schematic diagram of an alternative generative adversarial network embodying the invention.

FIG. 12 shows the approximation of the argmax. The forward pass is indicated by the rightward curved arrows, while backward pass is indicated by leftward curved arrows. The RGB input image is x. The segmentation network, $s_{logits}$, in this diagram outputs the logits. The argmax operation returns a one-hot encoded argmax. $\tau$ is a hyperparameter that influences how much the prediction is sharpened; $\tilde{y}$ is the differentiable argmax approximation; b is the ground-truth betting map; and $\hat{b}$ is the prediction betting map.

The softmax operation, $$\sigma(x)_{i,j} = \frac{e^{x_{i,j}}}{\Sigma_{k,l}^{wh} e^{x_{k,l}}},$$

is performed immediately after the output of the final convolutional layer (the logits) of the segmentation network. The argmax function returns a one-hot encoding of the argmax instead of the argument of the maximum value. The hyperparameter $\tau$ controls how much the softmax function is steepened. The argmax approximation is input to the gambler network together with the RGB input image x. The gambler network outputs a betting map, $\hat{b}$ (i.e. a set of weights). Thereafter, the final step of the forward pass is the calculation of the loss.

In the backward pass, there is no backpropagation over the argmax operation, simply because it is not possible. Essentially, the entire operation adds an extra amount to the maximum value in all the softmax vectors, setting it further away from the other predictions. An advantage over using the temperature softmax is that the gradients do not explode or vanish in the backward pass. Instead, the steepness, and therefore the magnitude of the gradients, of the softmax remains the same. However, in the backward pass, there is a shift in the input. For example, if the maximum value of the softmax originally was 0.6 and this value was enlarged to 0.9 to bring it closer to the one-hot representation, then the present approach obtains gradients for the latter and further backpropagates it on the former.

Hence, the complete objective for the segmenter is again the combination of adversarial loss with the cross-entropy loss:

$$\mathcal{L}_s = \mathcal{L}_{ce}(s(x),y) + \lambda_g \mathcal{L}_g(s_{arg}(x;\theta_s),0)$$

Figure 13:
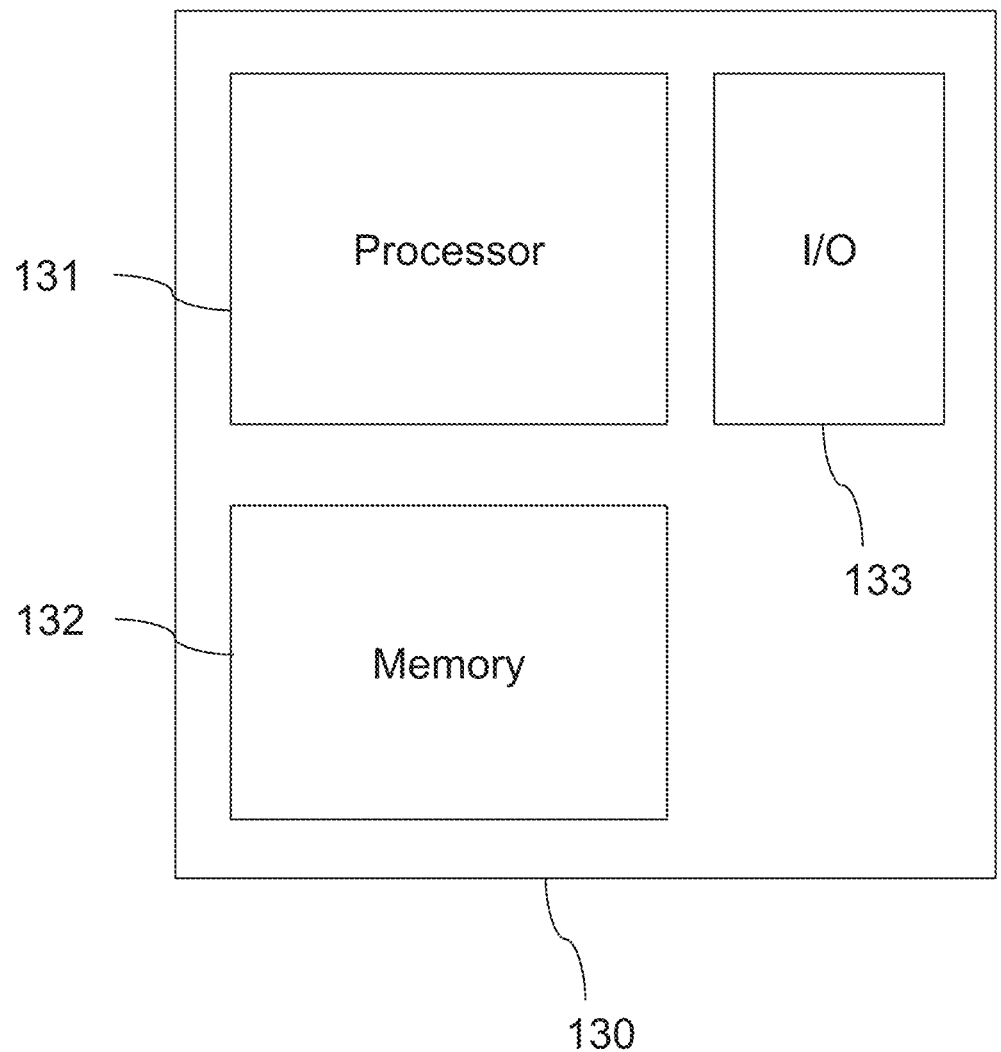
FIG. 13 is a schematic diagram of a computer system embodying the invention.

FIG. 13 shows an exemplary computer processing system on which embodiments may be implemented. A computer 130 comprises a processor 131 (e.g. an Intel™ processor) arranged to executed software stored in a memory 132. The processor 131 also uses the memory 132 for reading and writing data, such as input data, intermediate calculation results, and output data. Software may control the processor 131 to implement any of the methods disclosed herein. The computer 130 has input/output peripherals—e.g. for receiving training data and/or for exporting data encoding the trained network.

The network may be trained centrally and the trained network replicated and installed on other devices such as car guidance or warning systems, or the training may take place in the field, e.g. as continual learning within a control system of an autonomous vehicle.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of training a generative adversarial network for performing semantic segmentation of images, wherein the generative adversarial network comprises:
a generator neural network; and
a critic neural network,
the method comprising:
using the generator neural network to generate predicted image segmentation maps from input images, wherein each predicted image segmentation map comprises a classification prediction for each of a plurality of pixels of a respective input image;
providing one or more predicted image segmentation maps generated by the generator neural network to the critic neural network;
training the critic neural network to determine weights for respective pixels of a predicted image segmentation map generated by the generator neural network, wherein the weight for each pixel is used to weight a pixel-wise cross entropy term in an objective function for the critic neural network; and
using the weights determined by the critic neural network to train the generator neural network.

2. The method of claim 1, comprising performing a minimax training process to train the critic neural network and the generator neural network.

3. The method of claim 1, comprising evaluating the objective function for the critic neural network, for a predicted image segmentation map, by calculating the sum, over all pixels of the predicted image segmentation map, of the product of the weight for each pixel with a cross-entropy loss term for the respective pixel.

4. The method of claim 1, comprising training the generator neural network using a generator objective function that decreases as the critic objective function increases.

5. The method of claim 1, wherein the sum of all the weights over a predicted image segmentation map is limited to a threshold amount.

6. The method of claim 1, comprising determining the weights by applying a sigmoid function to a set of intermediate weight values generated within the critic neural network.

7. The method of claim 1, wherein determining the weights comprises applying a spatial smoothing function to a set of intermediate weight values generated within the critic neural network.

8. The method of claim 1, wherein the critic neural network receives only input images and image segmentation maps as forward pass inputs.

9. The method of claim 1, wherein the input images are photographic images of street scenes, and wherein the method comprises training the generative adversarial network to classify objects in the street scenes.

10. A computer processing system implementing a generative adversarial network for performing semantic segmentation of images, wherein the generative adversarial network comprises:
a generator neural network;
a critic neural network; and
training logic,
and wherein the training logic is configured to:
operate the generator neural network to generate predicted image segmentation maps from input images, wherein each predicted image segmentation map comprises a classification prediction for each of a plurality of pixels of a respective input image;
provide one or more predicted image segmentation maps generated by the generator neural network to the critic neural network;
train the critic neural network to determine weights for respective pixels of a predicted image segmentation map generated by the generator neural network, wherein the weight for each pixel is used to weight a pixel-wise cross-entropy term in an objective function for the critic neural network; and
use the weights determined by the critic neural network to train the generator neural network.

11. The computer processing system of claim 10, wherein the training logic is configured to evaluate the objective function for the critic neural network, for a predicted image segmentation map, by calculating the sum, over all pixels of the predicted image segmentation map, of the product of the weight for each pixel with a cross-entropy loss term for the respective pixel.

12. The computer processing system of claim 10, wherein the training logic is configured to train the generator neural network using a generator objective function that decreases as the critic objective function increases.

13. The computer processing system of claim 10, wherein the training logic is configured to determine the weights such that the sum of all the weights over a predicted image segmentation map is limited to a threshold amount.

14. The computer processing system of claim 10, wherein the training logic is configured to only input images and predicted image segmentation maps as forward pass inputs to the critic neural network.

15. A non-transitory computer readable medium having stored thereon a computer program product comprising instructions which, when executed on a computer processing system, cause the computer processing system to train a generative adversarial network for performing semantic segmentation of images, wherein the generative adversarial network comprises:
   a generator neural network; and
   a critic neural network,
   and wherein the instructions cause the computer processing system to:
   operate the generator neural network to generate predicted image segmentation maps from input images, wherein each predicted image segmentation map comprises a classification prediction for each of a plurality of pixels of a respective input image;
   provide one or more predicted image segmentation maps generated by the generator neural network to the critic neural network;
   train the critic neural network to determine weights for respective pixels of a predicted image segmentation map generated by the generator neural network, wherein the weight for each pixel is used to weight a pixel-wise cross-entropy term in an objective function for the critic neural network; and
   use the weights determined by the critic neural network to train the generator neural network.

16. The non-transitory computer readable medium of claim 15, wherein the sum of all the weights over a predicted image segmentation map is less than a threshold value.

17. The method of claim 1, wherein the weights are included in a betting map.

18. The method of claim 1, wherein the weights represent a confidence of the critic neural network in an accuracy of the classification prediction for the respective pixels.

19. The computer processing system of claim 10, wherein the weights are included in a betting map.

20. The computer processing system of claim 10, wherein the weights represent a confidence of the critic neural network in an accuracy of the classification prediction for the respective pixels.

21. The non-transitory computer readable medium of claim 15, wherein the weights are included in a betting map.

22. The non-transitory computer readable medium of claim 15, wherein the weights represent a confidence of the critic neural network in an accuracy of the classification prediction for the respective pixels.

* * * * *